United States Patent
Carranza et al.

(10) Patent No.: US 12,254,361 B2
(45) Date of Patent: *Mar. 18, 2025

(54) DYNAMIC APPLICATION PROGRAMMING INTERFACE (API) CONTRACT GENERATION AND CONVERSION THROUGH MICROSERVICE SIDECARS

(71) Applicant: Intel Corporation, Santa Clara, CA (US)

(72) Inventors: Marcos Carranza, Portland, OR (US); Cesar Martinez-Spessot, Hillsboro, OR (US); Mateo Guzman, Beaverton, OR (US); Francesc Guim Bernat, Barcelona (ES); Karthik Kumar, Chandler, AZ (US); Rajesh Poornachandran, Portland, OR (US); Kshitij Arun Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,245

(22) Filed: Dec. 15, 2023

(65) Prior Publication Data

US 2024/0111615 A1    Apr. 4, 2024

Related U.S. Application Data

(63) Continuation of application No. 17/556,682, filed on Dec. 20, 2021, now Pat. No. 11,880,727.

(51) Int. Cl.
*G06F 9/54* (2006.01)
*H04L 67/133* (2022.01)

(52) U.S. Cl.
CPC ............ *G06F 9/547* (2013.01); *H04L 67/133* (2022.05)

(58) Field of Classification Search
None
See application file for complete search history.

(56) References Cited

U.S. PATENT DOCUMENTS 10,230,571 B2    3/2019    Rangasamy et al.
10,764,244 B1    9/2020    Mestery et al.
(Continued)

FOREIGN PATENT DOCUMENTS

WO    2023121751    6/2023

OTHER PUBLICATIONS

Bachina, Bhargav, "Kubernetes—Learn Sidecar Container Pattern," Bachina Labs, Medium, Accessed at https://medium.com/bb-tutorials-and-thoughts/kubernetes-learn-sidecar-container-pattern-6d8c21f873d, Sep. 6, 2020, 24 pages.
(Continued)

*Primary Examiner* — Syed A Roni
(74) *Attorney, Agent, or Firm* — Jaffery Watson Mendonsa & Hamilton LLP

(57) ABSTRACT

Embodiments described herein are generally directed to the use of sidecars to perform dynamic Application Programming Interface (API) contract generation and conversion. In an example, a first sidecar of a source microservice intercepts a first call to a first API exposed by a destination microservice. The first call makes use of a first API technology specified by a first contract and is originated by the source microservice. An API technology is selected from multiple API technologies. The selected API technology is determined to be different than the first API technology. Based on the first contract, a second contract is dynamically generated that specifies an intermediate API that makes use of the selected API technology. A second sidecar of the destination microservice is caused to generate the intermediate API and connect the intermediate API to the first API.

16 Claims, 9 Drawing Sheets

(56) References Cited

U.S. PATENT DOCUMENTS

| | | | |
|---|---|---|---|
| 11,057,393 B2 | 7/2021 | Coffing | |
| 2020/0344233 A1 | 10/2020 | Lai et al. | |
| 2022/0291973 A1* | 9/2022 | Wangde | ................ G06F 9/5055 |

OTHER PUBLICATIONS

Cachada, Armindo, "What is a Kubernetes Sidecar Container?," Splotch Smart Solutions, Accessed at https://spltech.co.uk/what-is-a-kubernetes-sidecar-container/, Apr. 2, 2022, 7 pages.

Tozzi, Chris, "The Reasons to Use (or Not to Use) Sidecars in Kubernetes," SearchAppArchitecture.com, Tech Target, Accessed at: https://www.techtarget.com/search apparch itecture/tip/The-reasons-to-u se-or-not-use-sidecars-i n- Kubernetes?vgnextfmt= print, May 28, 2021, 2 pages.

International Search Report and Written Opinion for PCT Application No. PCT/US2022-046835 mailed issued Jan. 16, 2023, 11 pages.

International Preliminary Report on Patentability for PCT Application No. PCT/US2022-046835 mailed issued Jul. 4, 2024, 8 pages.

\* cited by examiner

DYNAMIC APPLICATION PROGRAMMING INTERFACE (API) CONTRACT GENERATION AND CONVERSION THROUGH MICROSERVICE SIDECARS

CROSS-REFERENCE TO RELATED APPLICATIONS

This application is a continuation of U.S. patent application Ser. No. 17/556,682, filed Dec. 20, 2021, now U.S. Pat. No. 11,880,727, the entire contents of which are hereby incorporated herein by reference for all purposes.

TECHNICAL FIELD

Embodiments described herein generally relate to the field of microservices and communication among microservices and, more particularly, to the use of sidecars of microservices to facilitate efficient communications among microservices by performing dynamic application programming interface (API) contract generation and conversion between API technologies, for example, to make use of an preferred API technology for which the underlying hardware platform has been optimized or a dynamically selected API technology deemed best suited for the type of data being exchanged.

BACKGROUND

Microservice architecture takes advantage of the fact that applications are simpler to build and maintain when broken down into smaller pieces that work seamlessly together. In contrast to the more traditional monolithic application architectures, the microservice architecture is an architectural style that structures an application as a collection of smaller, more specialized parts that implement core business logic called services (or microservices), each of which communicate with one another across common interfaces provided by various API technologies (e.g., GraphQL, Representational State Transfer (REST), and gRPC Remote Procedure Call (gRPC)). Microservices are increasingly being used in the development world as developers work to create larger, more complex applications that are better developed and managed as a combination of smaller services that work cohesively together for more extensive, application-wide functionality.

The sidecar design pattern allows developers to add a number of capabilities to applications by attaching sidecars to microservices to extend/enhance the functionality of respective microservices.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
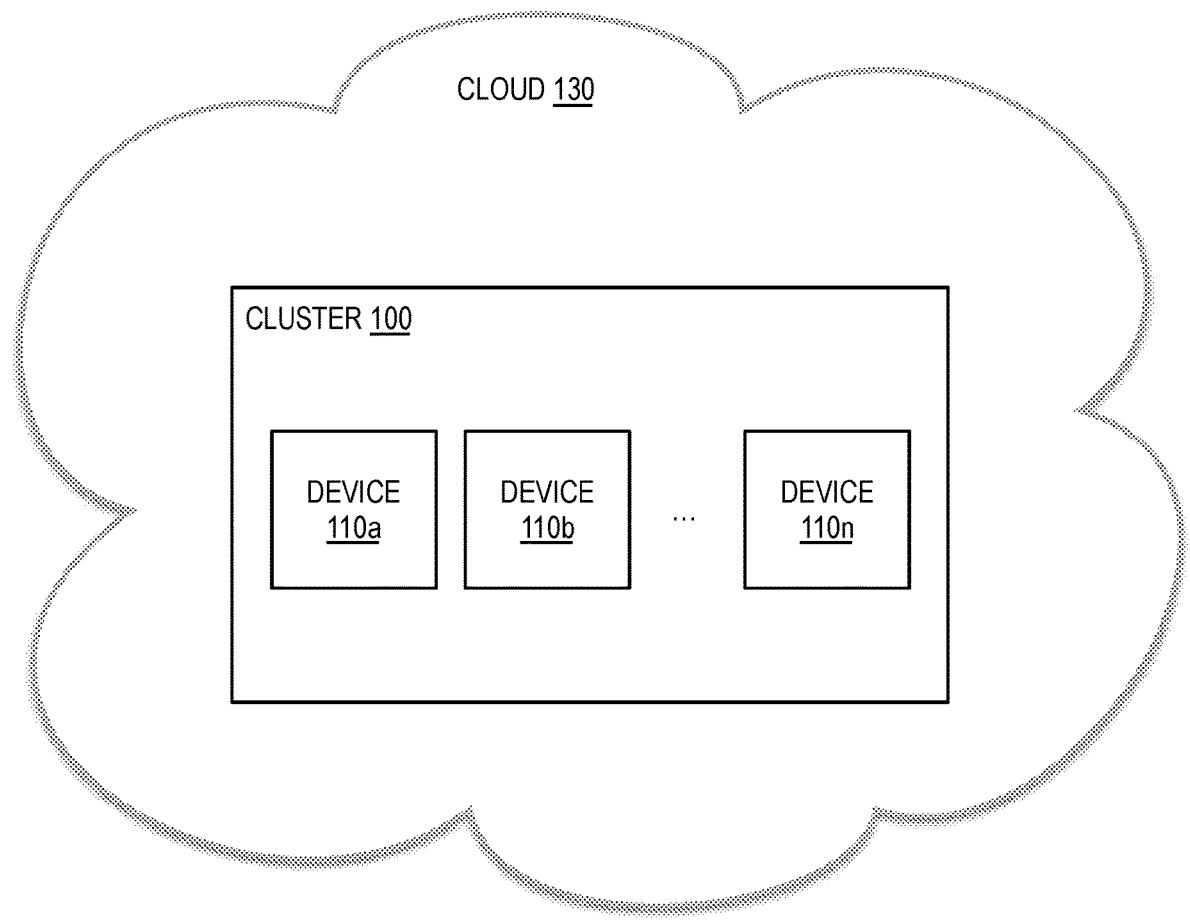
FIG. 1 is a block diagram illustrating a cluster in which various embodiments may be implemented.

Embodiments described herein are generally directed to the use of sidecars to perform dynamic API contract generation and conversion. At scale, the communication between microservices that make up an application may generate a massive volume of networking traffic. There are a number of different API technologies (which may also be referred to herein as API types) currently in use for communicating among microservices, including GraphQL, REST, and gRPC. A particular API technology may result in more efficient communications (e.g., lower latency) depending upon various factors. For example, a hardware platform (e.g., a Central Processing Unit (CPU), an XPU, or a host system including one or more processors and one or more integrated or discrete XPUs of a particular vendor may include built-in optimizations for the particular API technology.

Alternatively, a particular API technology may be more suitable for the type of data being exchanged (e.g., length of parameters, variable types, and/or the like). Application developers generally make use of API technologies with which they are familiar or for which API tools are made available by their employer. As such, at present, communications among microservices may achieve superior performance in so far as the application developers happen to have made use of the particular API technology (e.g., gRPC) for which the underlying hardware platform has been optimized; however, such communications will otherwise receive no performance benefit.

By convention, in various examples described herein, the term "source microservice" may be used to refer to a microservice making a call to (or invoking a method of) a first API exposed, for example, by another microservice (which may be referred to herein as a "destination microservice") or by a conversion API exposed by a sidecar of the destination microservice. As described further below, a conversion API may represent an intermediate API logically interposed between the respective sidecars of the source and destination microservices through which all communications to and from the microservices pass. In this manner, regardless of the API type of the API exposed by the destination microservice, a statically or dynamically selected API type may be used for communications between the respective sidecars transparently to the microservices and without requiring any changes to the microservices.

Embodiments described herein seek to facilitate enhanced communication efficiencies regardless of the API technology implemented by APIs exposed by source and destination microservices by, in-line with a given call originated by the source microservice or in the background, selecting an API technology deemed best in the circumstances to communicate between sidecars of the respective microservice, including performing automated API contact generation/conversion between the API technology implemented at the source to the selected API technology. According to one embodiment and as explained further below, a first call by a source microservice to a first API of a destination microservice is intercepted by a first sidecar of the source microservice. The first API is of a first API type (e.g., GraphQL) of multiple API types (e.g., GraphQL, REST, gRPC, or the like) and is specified by a first contract. An API type (e.g., gRPC) of the multiple API types is selected by the first sidecar, for example, (i) statically based on configuration information (e.g., a configuration file) associated with the underlying hardware platform (e.g., an Infrastructure Processing Unit (IPU) or other XPU, a CPU, or a host system including one or more processors and one or more integrated or discrete XPUs) specifying (e.g., as part of a configuration file) a preferred API type (e.g., gRPC) that is optimized on the hardware platform or (ii) dynamically (on a call-by-call basis) based on one or more characteristics of the first call (e.g., a length of parameters associated with the first call, a type of data being exchanged via the first call, historical performance of the first call, conversion telemetry, and/or other characteristics). Responsive to determining the statically or dynamically selected API type differs from the first API type, the first contract may be transformed into a second contract specifying a second API of the selected API type corresponding to the first API; and a second sidecar of the destination microservice may be caused by the first sidecar communicating the second contract to the second sidecar to generate the second API and internally connect the second API to the first API via a converter module implemented by the second sidecar based on the second contract.

As described further below, in some embodiments, the first sidecar requests a stub of the first API from the second sidecar by using the address previously received from a discovery service but using a special port defined for API negotiation. This stub may then be used as a plugin in the first sidecar and can be immediately deployed for the original call, or in order to avoid delays can be set up for use in connection with subsequent calls using the same API. When the plugin is not immediately deployed, call flow may continue using the first API (which may not be optimized), but the preparation of plugin deployment and generation of optimized conversion APIs by the second sidecar may be performed in background.

While various embodiments described herein may be described with reference to specifically enumerated API technologies or types, the methodologies described herein are generally applicable to other existing API technologies and/or those that may be introduced in the future. Additionally, while various embodiments described herein may be described with reference to the use of a central discovery service to enable the sharing of resource information among all sidecars regarding microservice uniform resource identifies (URIs), API types, and contracts, it is to be appreciated decentralized approaches (e.g., use of a gossip protocol) may be used in alternative embodiments.

In the following description, numerous specific details are set forth in order to provide a thorough understanding of example embodiments. It will be apparent, however, to one skilled in the art that embodiments described herein may be practiced without some of these specific details.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein an "XPU" generally refers to an offload target (e.g., a hardware accelerator) commanded by a CPU. In a heterogeneous computing environment (e.g., one or more host devices having one or more integrated XPUs or one or more associated discrete XPUs), microservices may be concurrently executing on different types of hardware accelerators. Non-limiting examples of XPUs include Graphics Processing Units (GPUs), Field-Programmable Gate Arrays (FPGAs), Application-Specific Integrated Circuits (ASICs), Digital Signal Processors (DSPs), Tensor Processing Units (TPUs), Video Processing Units (VPUs), Infrastructure Processing Units (IPUs), Application Processing Units (APUs), Data Processing Units (DPUs), Network Processing Units (NPUs), and Smart Network Interface Cards (SmartNICs).

As used herein an "API contract" or more simply a "contract" generally refers to a form of documentation or a file containing information regarding the API at issue. An API contract generally represents a shared understanding of what the capabilities of a digital interface are, thereby facilitating the development of a distributed collection of microservices of an application that make use of the digital interface. For example, an API contract may represent or otherwise include a machine-readable definition of an API interface (or service definition), describing the surface area of the request and response of each individual API method being offered using a common format like API Blueprint, the OpenAPI Specification (formerly, Swagger) or RESTful API Modeling Language (RAML). An API contract may also include information regarding the endpoints (e.g., Uniform Resource Locators (URLs) or URIs), the actions of each endpoint, arguments, examples of the responses and potentially other details.

Example Operational Environment

FIG. 1 is a block diagram illustrating a cluster 100 in which various embodiments may be implemented. In various examples described herein an application may run in the form of a collection of microservices distributed across one or more devices (e.g., devices 110a-n) of one or more host systems representing a homogeneous or heterogeneous computing environment. The devices may represent CPUs and/or XPUs of the same or different host systems and may be configured to be part of a cluster 100 (e.g., a Kubernetes cluster). Additionally, the devices may represent on-premise, hybrid, or public cloud infrastructure (e.g., cloud 130). A simplified and non-limiting example of a microservice-based architecture showing two microservice is described further below with reference to FIG. 2.

Example Microservices Architecture

Figure 2:
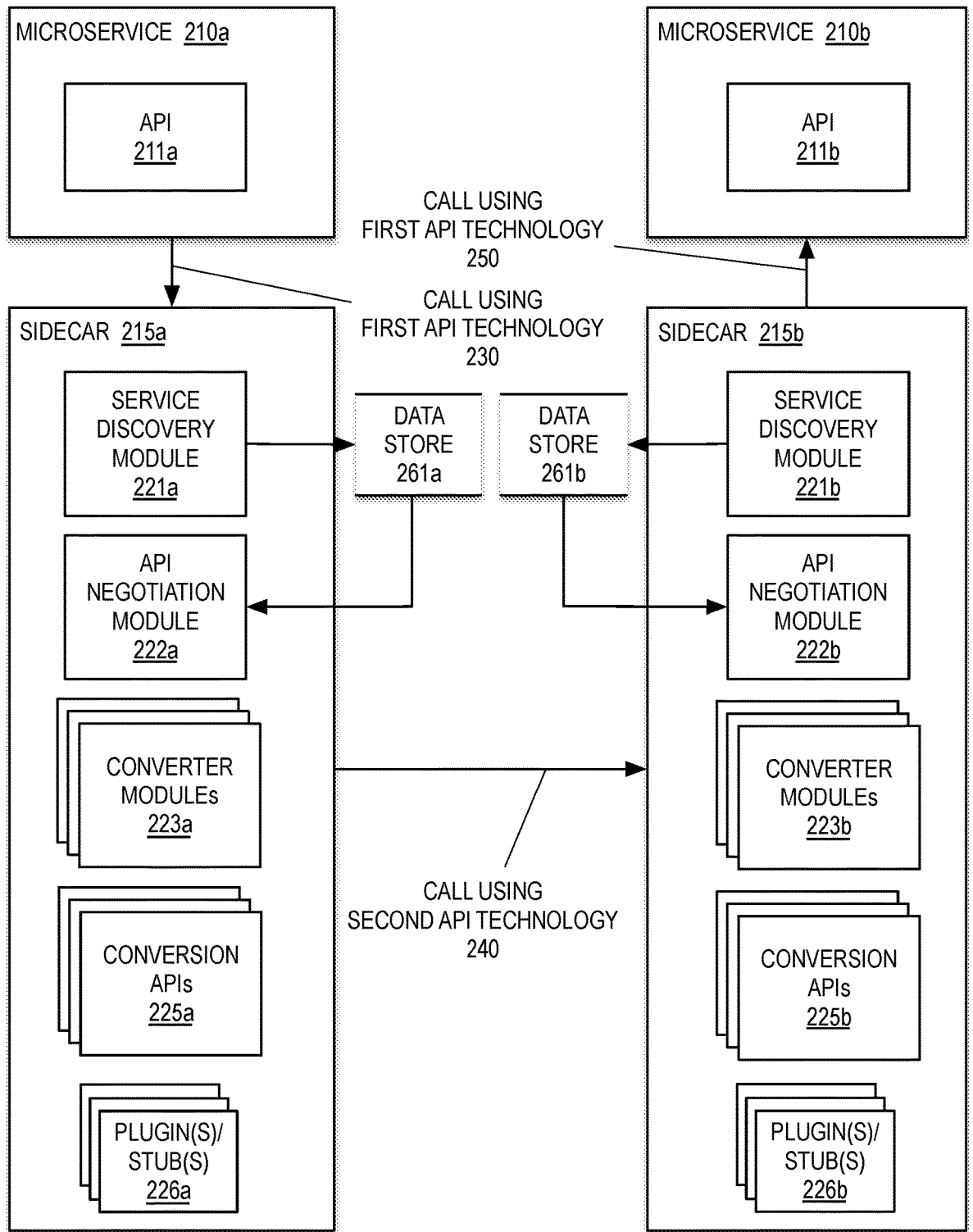
FIG. 2 is a block diagram illustrating communication between microservices according to some embodiments.

FIG. 2 is a block diagram illustrating communication between microservices 210a and 210b according to some embodiments. In the context of the present example, for purposes of illustration, two microservices 210a and 210b are shown each exposing respective APIs 211a and 211b. The microservice 210a-b may be a subset of a larger collection of microservices of an application that may be distributed across one or more devices (e.g., devices 110a-n of FIG. 1).

Each microservice 210a and 210b has a sidecar (e.g., sidecar 215a and sidecar 215b, respectively) associated therewith or attached thereto. In one embodiment, a given sidecar may be associated with its respective microservice by injecting the sidecar into the same pod as the microservice and configuring the sidecar to operate as a forward and reverse proxy for all traffic originated by and directed to the microservice, respectively, thereby allowing the given sidecar to intercept all traffic in or out of the microservice.

In the context of the present example, as between microservices 210a and 210b, microservice 210a may be referred to as the source microservice as it is making a first call (e.g., a call using first API technology 230) to API 211b exposed by microservice 210b (which may be referred to herein as the destination microservice as between microservices 210a and 210b). In various examples described herein, regardless of the API technology (or API type) of API 211b (which, in this example, may be referred to as the "first API technology") exposed by the destination microservice, a different API technology (or a different API type) of a preferred or selected API (which, in this example, may be referred to as the "second API technology") may be transparently used for communications between the respective sidecars to facilitate more efficient communications. In the context of the present example and as explained in further detail below, responsive to interception of the first call, sidecar 215a transforms the first call into a second call (i.e., a call using second API technology) to a conversion API (e.g., one of conversion APIs 225b), which may be dynamically generated and deployed by sidecar 215b during an API negotiation process, that makes use of the second API technology. Responsive to interception of the second call by sidecar 215b, sidecar 215b transforms the second call to a third call (i.e., a call using first API technology 250).

In this manner, neither the source microservice nor the destination microservice are aware of the translation to the intermediate API technology when and as appropriate for the circumstances. Rather, the complexities of, among other things, dynamically or statically selecting an API technology appropriate for the context and the performance of translations between API technologies as appropriate may be offloaded to the sidecars, thereby facilitating efficient communications between microservices, Additionally, the approach proposed allows developers to avoid being distracted by the intricacies of optimizing communications between microservices; therefore, allowing developers to instead focus their attention on the core business functionality of the application at issue. As those skilled in the art will appreciate, legacy applications may also easily be updated to achieve more efficient communications by simply deploying the sidecar design pattern described herein and without modifying the code of the microservices.

The APIs 211a and 211b may employ any of a number of existing or future API technologies (e.g., e.g., GraphQL, Representational State Transfer (REST), gRPC Remote Procedure Call (gRPC), or the like). As explained further below, depending upon the particular implementation (e.g., whether static or dynamic API conversion processing is performed), API 211b exposed by microservice 210b implements a first API technology and a second API technology (different from the first API technology) is used to communicate from sidecar 215a to sidecar 215b, when the first API technology is not a preferred API technology (e.g., one optimized on the hardware platform on which microservice 210a and 210b are running) or when the first API technology is not one deemed best suited based on one or more characteristics of the call being made.

Turning now to the sidecars 215a-b, they each include respective service discovery modules 221a-b, API negotiation modules 222a-b, converter modules 223a-b, conversion AIPs 225a-b, and plugin(s)/stub(s) 226a-b. The roles and/or responsibilities of these modules may differ depending upon whether the sidecar is associated with the source microservice (microservice 210a in the present example) or the destination microservice (microservice 210b in the present example).

In one embodiment, the service discovery modules 221a-b may be responsible for resolving addresses and obtaining other resource information for a given microservice from a central discovery service (not shown). In addition to storing the addresses (e.g., universal resource identifiers (URIs)) of microservices 210a-b, the central discovery service may also serve as a repository for API types and contracts of the microservices 210a-b that may be accessible to all microservices of the application at issue. As explained further below with reference to FIG. 3 according to one embodiment, service discovery modules 221a and 221b may proxy requests issued to the central discovery service from microservice 210a and microservice 210b, respectively, as well as the responses and may also locally cache a portion or all of the response for subsequent use by their respective API negotiation modules 222a and 222b, respectively, within data store 261a and 261b, respectively.

The API negotiation modules 222a-b may be responsible for dynamically putting in place infrastructure for what has been identified as the most efficient communication mechanism (e.g., one of GraphQL, REST, or gRPC) between microservices 210a-b (or more specifically, between sidecars 215a and 215b). Depending upon the particular implementation, the communication mechanism may be statically selected (e.g., based on configurations specified with in a configuration file of the underlying hardware platform) or dynamically selected (e.g., on a call-by-call basis). When the API negotiation module is operating within a sidecar (e.g., sidecar 215a) of the source microservice (which may be referred to herein as the "source-side API negotiation module"), during static API conversion processing, during dynamic API conversion processing, or in the background, the API negotiation module may be responsible for causing the API negotiation module of other sidecar (e.g., sidecar 215b) of the destination microservice (which may be referred to herein as the "destination-side API negotiation module") to generate and deploy a conversion API (e.g., one of conversion APIs 225b) that employs the second API technology (or, stated another way, is of a second API type). The source-side API negotiation module may also be responsible for retrieving a stub (e.g., one of plugin(s)/stub(s) 226b) from the destination-side API negotiation module that implements the first call and deploying it within sidecar 215a as a plugin (e.g., one of plugin(s)/stub(s) 226a) to redirect the first call to the conversion API. Further details regarding the functionality of the API negotiation modules 222a-b are described further below with reference to FIG. 7.

The converter modules 223a and 223b may be responsible for transforming the first call to the second call and the second call to the third call, respectively. For example, assuming the first API technology is REST and the second API technology is gRPC, converter module 223a may transform a REST call in the following general form into a gRPC call in the general form immediately below the REST call:

REST GET [URI_Service1_v1]/?[Query_String]
gRPC rpc Service1_v1 (Query String Params) return (Service1Response)

According to one embodiment, the converter modules 223a-b may make use of compiler plugins to convert from language to language. Specifically, with reference to the above example conversion of REST to gRPC, the converter modules 223a-b may provide protocol buffer compiler plugins that generate client- and server-side code for wrapping the parameters for the call in the appropriate protocol buffer message type.

In one embodiment, destination-side conversion APIs (e.g., conversion APIs 225b) represent APIs dynamically generated and deployed within sidecar 215b, for example, during an API negotiation process between a sidecar (e.g., sidecar 215a) of a source microservice (e.g., microservice 210a) and sidecar 215b. In various examples described herein, destination-side conversion APIs employ a statically selected API technology (e.g., for which the underlying hardware platform may include optimizations and which may also be referred to herein as the "preferred API technology") or a dynamically selected API technology (e.g., expected to perform more efficiently based on the characteristics of call at issue).

In the context of the present example, a given stub of plugin(s)/stub(s) 226b (a destination-side stub) represents a mock of API 211b that implements calls (e.g., the first call) to API 211b. A given stub of plugin(s)/stub(s) 226a (a source-side stub) represents a stub that has been retrieved from sidecar 215b, for example, via the API negotiation module 210b. In various examples described herein, after a given stub has modified to redirect calls to a conversion API of conversion APIs 225b (e.g., redirect the first call to the second call), thereby logically interposing the conversion API between the source microservice and the destination microservice, by convention, it may be referred to herein as a plugin.

The various modules of the sidecars 215a-b, the microservices 210a-b, and the processing described below with reference to the flow diagrams of FIGS. 3-7 may be implemented in the form of executable instructions stored on a machine readable medium and executed by a processing resource (e.g., a microcontroller, a microprocessor, a CPU core, an ASIC, an FPGA, or the like) and/or in the form of other types of electronic circuitry. For example, the processing may be performed by one or more virtual or physical computer systems of various forms, such as the computer system described below with reference to FIG. 8.

Sidecar Event Processing

Figure 3:
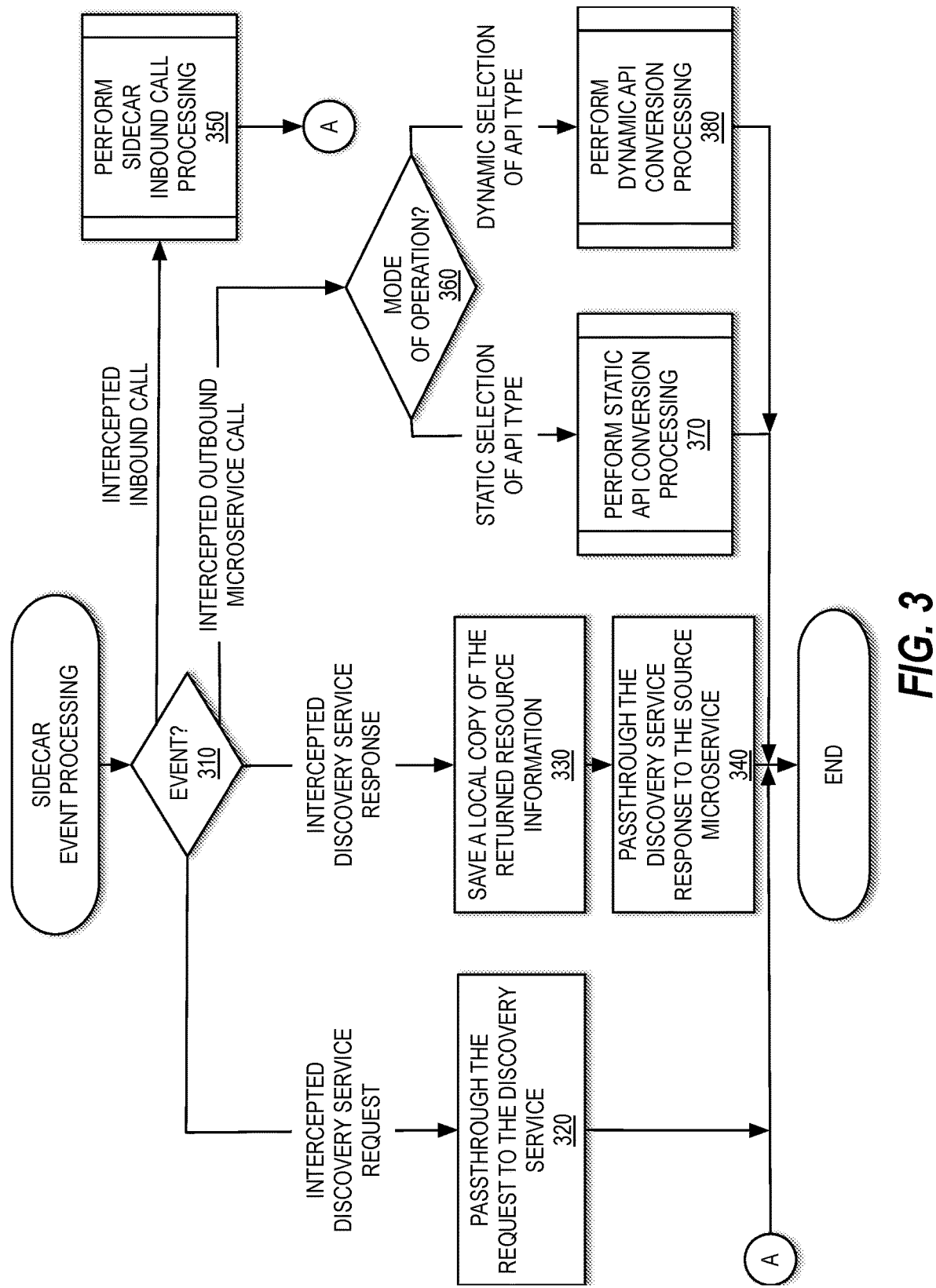
FIG. 3 is a flow diagram illustrating operations for performing sidecar event processing according to some embodiments.

FIG. 3 is a flow diagram illustrating operations for performing sidecar event processing according to some embodiments. At decision block 310, an event representing the interception of inbound traffic to or output traffic from the microservice (e.g., microservice 210a or microservice 210b) with which the sidecar (e.g., sidecar 215a or sidecar 215b) is associated is received. If the event represents a discovery service request made by the microservice has been intercepted, processing continues with block 320. If the event represents a response from the discovery service has been intercepted, processing continues with block 330. If the event represents an outbound call made by the microservice has been intercepted, processing continues with decision block 360. If the event represents an inbound call has been intercepted, processing continues with decision block 350.

At block 320, the intercepted request to the discovery service is passed through by the sidecar to the discovery service.

At block 330, a local copy of some portion (e.g., the API type and API contract of the API (e.g., API 211b) of the destination microservice (e.g., microservice 210b)) or all of the resource information returned by the discovery service in the intercepted discovery service response is saved locally, for example, in a data store (e.g., data store 261a). According to one embodiment, this local caching of resource information is in anticipation of the use of such information in connection with performing API negotiation processing responsive to a predicted imminent call to the API of the destination microservice by the source microservice (e.g., microservice 210a)

At block 340, the intercepted response to the discovery service is passed through by the sidecar to the source microservice.

At block 350, in response to the intercepted inbound call, the sidecar performs sidecar inbound call processing. The intercepted inbound call may represent a call made by a sidecar of the source microservice to either the API of the destination microservice or a conversion API (e.g., one of conversion APIs 225b). A non-limiting example of sidecar inbound call processing that may be performed by the sidecar of the destination microservice is described below with reference to FIG. 4.

At decision block 360, the mode of operation of the sidecar of the sidecar of the source microservice is determined. If the sidecar of the source microservice is configured to perform a static selection of an API type (e.g., based on a configuration file associated with the hardware platform on which the source microservice is running) for use in connection with communications to the destination, processing continues with block 370; otherwise, in the context of the present example, it is assumed the source microservice is configured to perform a dynamic selection of an API type (e.g., one a call-by-call basis based on characteristics of the intercepted outbound call) for use in connection with communications to the destination.

At block 370, static API conversion processing is performed, for example, to redirect the call to an intermediate conversion API (e.g., one of conversion APIs 225b) of the sidecar of the destination microservice that is of a statically selected API type. A non-limiting example of static API conversion processing that may be performed by the sidecar of the source microservice is described below with reference to FIG. 5.

At block 380, dynamic API conversion processing is performed, for example, to redirect the call to an intermediate conversion API (e.g., one of conversion APIs 225b) of the sidecar of the destination microservice that is of a dynamically selected API type. A non-limiting example of dynamic API conversion processing that may be performed by the sidecar of the source microservice is described below with reference to FIG. 6. By allowing the sidecar of the source destination microservice to select (statically or dynamically) a target API technology, for example, that has been optimized by the underlying hardware platform or that is identified on a call-by-call basis as being best suited for the call at issue, the peer sidecars may exchange communications via a different API technology than that of the API of the destination microservice to achieve more efficient communications.

While not shown in FIG. 3, it is to be appreciated another form of traffic that may be intercepted by the sidecar relates to requests/responses conveyed via the special port or explicit API used to communicate between the source-side and destination-side API negotiation modules, for example, for purposes of requesting/returning the stub for the API (e.g., API 211b) and/or to provide by the source-side API negotiation module a new contract to the destination-side API negotiation module corresponding to the API (e.g., API 211b) of the destination microservice that specifies a new conversion API (e.g., one of conversion APIs 225b) of the selected API type.

Sidecar Inbound Call Processing

Figure 4:
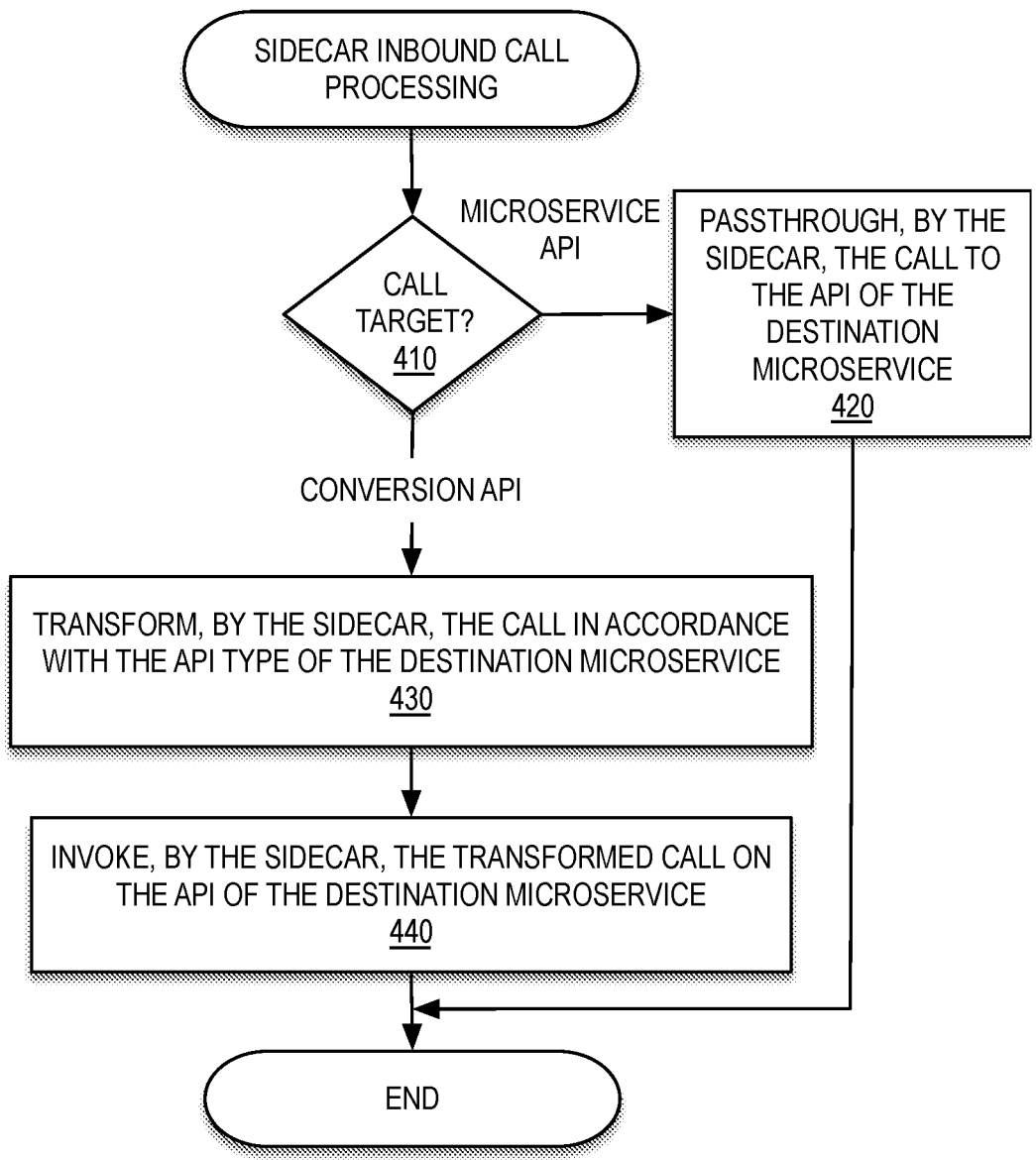
FIG. 4 is a flow diagram illustrating operations for performing sidecar inbound call processing according to some embodiments.

FIG. 4 is a flow diagram illustrating operations for performing sidecar inbound call processing according to some embodiments. The processing described with reference to FIG. 4 represents an example of processing that may be performed by block 350 of FIG. 3 responsive to interception by a sidecar (e.g., sidecar 215b) of a destination microservice (e.g., microservice 210b) of an inbound call made by a sidecar (e.g., sidecar 215a) of a source microservice (e.g., microservice 210a).

At decision block 410, the call is handled based on the call target. If the target of the call is the API (e.g., API 211b) of the destination microservice, processing branches to block 420; otherwise, if the target of the call is a conversion API (e.g., one of conversion APIs 225b), processing continues with block 430.

At block 420, the intercepted call is passed through by the sidecar to the API of the destination microservice. Depending upon the particular implementation, when the call target is the API of the destination microservice, the original call (e.g., call using first API technology 250 of FIG. 2) by the source microservice (i) may match the selected API type, thereby having no need for translation; or (ii) may not match the selected API type but the infrastructure to enhance the communication efficiency of the call is being generated and deployed in the background for subsequent calls.

At block 430, the intercepted call represents a call to an API type different than that of the API of the destination microservice. In the context of FIG. 2, the intercepted call corresponds to the call using second API technology 240. According to one embodiment, the intercepted call is transformed in accordance with the API type of the destination microservice. For example, the sidecar may direct the intercepted call to a corresponding conversion API (e.g., one of conversion APIs 225) previously generated and deployed by the sidecar (e.g., as described below with reference to FIG. 7) and to which the original call has been redirected by a corresponding plugin (e.g., one of plugin(s)/stub(s) 226a). The corresponding conversion API may make use of a converter module (e.g., one of converter modules 223b) to transform the call from the API type of the conversion API to the API type of the destination microservice.

At block 440, the transformed call is invoked on the API of the destination microservice. In the context of FIG. 2, the transformed call corresponds to the call using first API technology 250.

Static API Conversion

Figure 5:
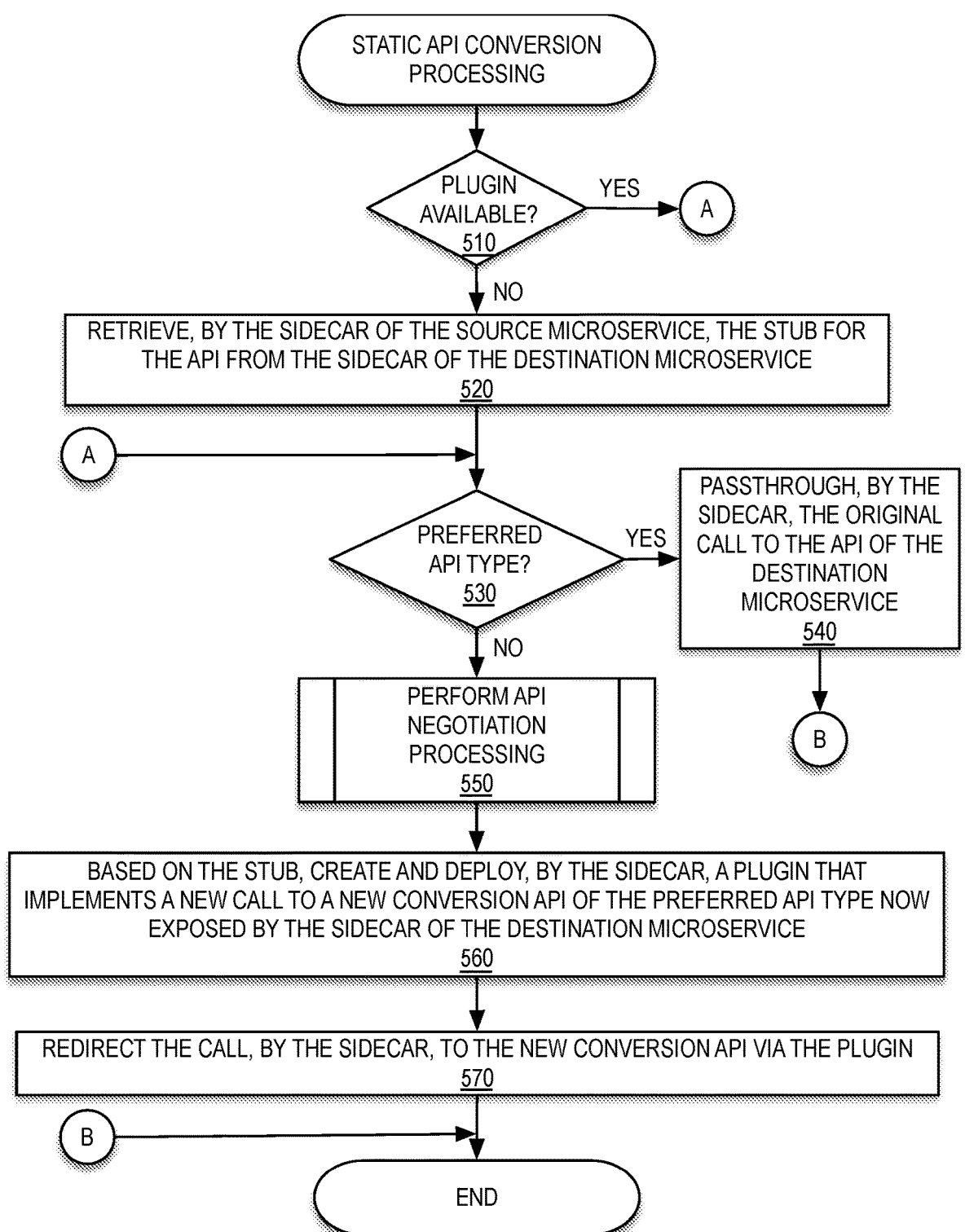
FIG. 5 is a flow diagram illustrating operations for performing static API conversion processing according to some embodiments.

FIG. 5 is a flow diagram illustrating operations for performing static API conversion processing according to some embodiments. The processing described with reference to FIG. 5 represents an example of processing that may be performed by block 370 of FIG. 3 responsive to interception by a sidecar (e.g., sidecar 215a) of a source microservice (e.g., microservice 210a) of an outbound microservice call made by the source microservice in which the sidecar is configured to statically select an API technology for communications with a remote sidecar (e.g., sidecar 215b) of the destination microservice (e.g., microservice 210b).

At decision block 510, it is determined whether a plugin is available corresponding to the intercepted call. If not, processing continues with block 520; otherwise, processing branches to decision block 530. In one embodiment, when processing a first call to the API of the destination API, the plugin will not be available and instead is created and deployed at that time or in the background. Thereafter, for subsequent such calls, the plugin will be available to redirect the intercepted call via a corresponding converter module (e.g., one of converter modules 223a) to a corresponding conversion API (e.g., one of conversion APIs 223b).

At block 520, the sidecar retrieves the stub (e.g., one of plugin(s)/stubs(s) 226b) for the API (e.g., API 211b) of the destination microservice from the remote sidecar associated with the destination microservice. In one embodiment, the sidecar issues a request on a special port that is associated with an API negotiation module (e.g., API negotiation module 222b) or that is otherwise used for API negotiation processing. Alternatively, the sidecar may issue a request via an explicit API of the remote sidecar that may be presented as a generic URI call, for example, so as to abstract out the point-to-point communication. Responsive to the request, the remote sidecar returns the requested stub via the special port or via a response to the request made via the explicit API.

At decision block 530, it is determined whether the API type of the API of the destination microservice matches the preferred API type (e.g., as statically configured for the hardware platform at issue in a configuration file). If so, processing branches to block 540; otherwise, processing continues with block 550. In one embodiment, the preferred API type is statically configured for the hardware platform on which the source microservice is running, for example, as specified in a configuration file stored on the hardware platform. As noted above, the preferred API type may be an API technology for which the underlying hardware platform has been optimized.

At block 540, the original call (e.g., the intercepted inbound call of FIG. 3) is passed through by the sidecar to the API of the destination microservice.

At block 550, the sidecar performs API negotiation processing, to among other things, cause the remote sidecar to generate and deploy an intermediate conversion API (e.g., one of conversion APIs 225b) of the preferred API type to allow the communication efficiency from the sidecar to the remote sidecar to be improved in terms of lower latency. According to one embodiment, the API negotiation processing is performed by an API negotiation module (e.g., API negotiation module 222a). A non-limiting example of the API negotiation processing that may be performed by the API negotiation module is described further below with reference to FIG. 7.

At block 560, based on the stub retrieved at block 520, the sidecar creates and deploys a plugin that implements a new call to a new conversion API (e.g., one of conversion APIs 225b) of the preferred API type now exposed by the remote sidecar as a result of completion of the API negotiation processing of block 550. In this manner, the original call (and subsequent such calls) may be redirected to the new conversion API.

At block 570, the original call is redirected by the sidecar to the new conversion API via the plugin in the form of the new call to the new conversion API of the preferred API type.

While in the context of the present example, the preparation of the plugin and the API negotiation processing is shown as being performed in-line with processing of the call at issue, in alternative embodiments, this processing may be performed in the background, for example, to avoid the overhead and potential delays associated with making a first call to the API of the destination micro service. In an implementation in which the preparation of the plugin and the API negotiation processing are performed in the background, the original call may be simply passed through unchanged (e.g., without being attempting to enhance the efficiency of communications by translating the call to the preferred API type) using the stub. Once the background processing has been completed, subsequent such calls can be redirected to the new conversion API via the plugin.

Dynamic API Conversion

Figure 6:
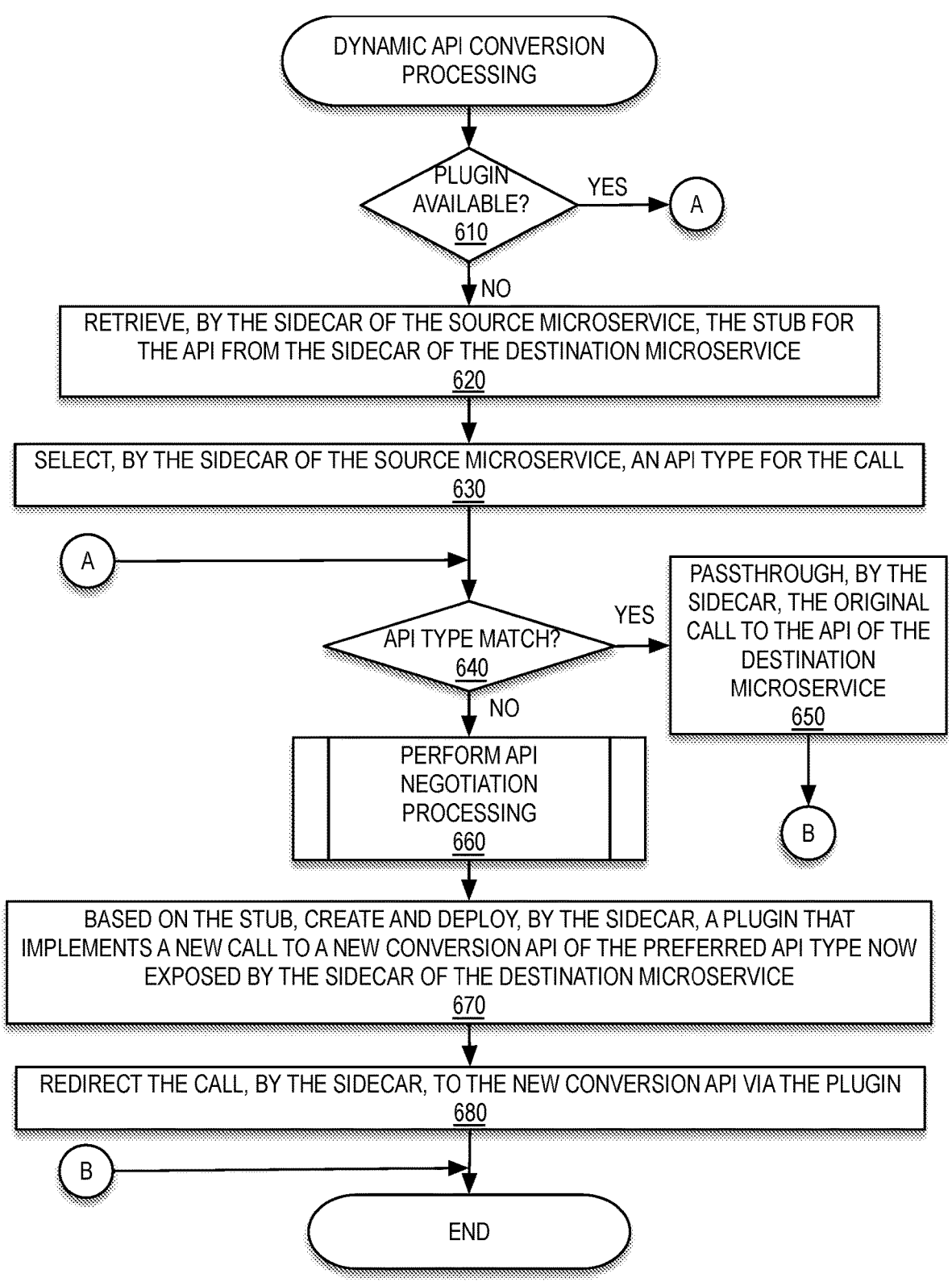
FIG. 6 is a flow diagram illustrating operations for performing dynamic API conversion processing according to some embodiments.

FIG. 6 is a flow diagram illustrating operations for performing dynamic API conversion processing according to some embodiments. The processing described with reference to FIG. 6 represents an example of processing that may be performed by block 380 of FIG. 3 responsive to interception by a sidecar (e.g., sidecar 215a) of a source microservice (e.g., microservice 210a) of an outbound microservice call made by the source microservice in which the sidecar is configured to dynamically select an API technology for communications with a remote sidecar (e.g., sidecar 215b) of the destination microservice (e.g., microservice 210b).

At decision block 610, it is determined whether a plugin is available corresponding to the intercepted call. If not, processing continues with block 620; otherwise, processing branches to decision block 640. As noted above with reference to FIG. 5, in one embodiment, when processing a first call to the API of the destination API, the plugin will not be available and instead is created and deployed at that time or in the background. Thereafter, for subsequent such calls, the plugin will be available to redirect the intercepted call via a corresponding converter module (e.g., one of converter modules 223a) to a corresponding conversion API (e.g., one of conversion APIs 223b).

At block 620, the sidecar retrieves the stub (e.g., one of plugin(s)/stubs(s) 226b) for the API (e.g., API 211b) of the destination microservice from the remote sidecar associated with the destination microservice. In one embodiment, the sidecar issues a request on a special port that is associated with an API negotiation module (e.g., API negotiation module 222b) or that is otherwise used for API negotiation processing. As noted above, alternatively, the sidecar may issue a request via an explicit API exposed by the remote sidecar. Responsive to the request, the remote sidecar returns the requested stub via the special port or via a response to the request made via the explicit API.

At block 630, the sidecar selects an API type for the call. In one embodiment, the selected API type is based on which of multiple available API technologies (e.g., GraphQL, REST, gRPC, or the like) is deemed best suited based on the characteristics of the call at issue. For example, the selection may take into consideration one or more of the length of parameters associated with the call, a type of data being exchanged via the call, historical performance of the call, historical conversion telemetry, historical latency associated with the use of each of the available API technologies, or the like.

At decision block 640, it is determined whether the API type of the API of the destination microservice matches the selected API type. If so, processing branches to block 650; otherwise, processing continues with block 660.

At block 650, the original call (e.g., the intercepted inbound call of FIG. 3) is passed through by the sidecar to the API of the destination microservice.

At block 660, the sidecar performs API negotiation processing, to among other things, cause the remote sidecar to generate and deploy an intermediate conversion API (e.g., one of conversion APIs 225b) of the selected API type to allow the communication efficiency from the sidecar to the remote sidecar to be improved in terms of lower latency. According to one embodiment, the API negotiation processing is performed by an API negotiation module (e.g., API negotiation module 222a). A non-limiting example of the API negotiation processing that may be performed by the API negotiation module is described further below with reference to FIG. 7.

At block 670, based on the stub retrieved at block 620, the sidecar creates and deploys a plugin that makes used of an appropriate conversion module (e.g., one of conversion modules 223a) and implements a new call to a new conversion API (e.g., one of conversion APIs 225b) of the preferred API type now exposed by the remote sidecar as a result of completion of the API negotiation processing of block 660. In this manner, the original call (and subsequent such calls) may be redirected to the new conversion API.

At block 680, the original call is redirected by the sidecar to the new conversion API via the plugin in the form of the new call to the new conversion API of the preferred API type.

While in the context of the present example, the preparation of the plugin and the API negotiation processing is shown as being performed in-line with processing of the call at issue, in alternative embodiments, this processing may be performed in the background, for example, to avoid the overhead and potential delays associated with making a first call to the API of the destination microservice. In an implementation in which the preparation of the plugin and the API negotiation processing are performed in the background, the original call may be simply passed through unchanged (e.g., without being attempting to enhance the efficiency of communications by translating the call to the dynamically selected API type) using the stub. Once the background processing has been completed, subsequent such calls can be redirected to the new conversion API via the plugin.

API Negotiation

Figure 7:
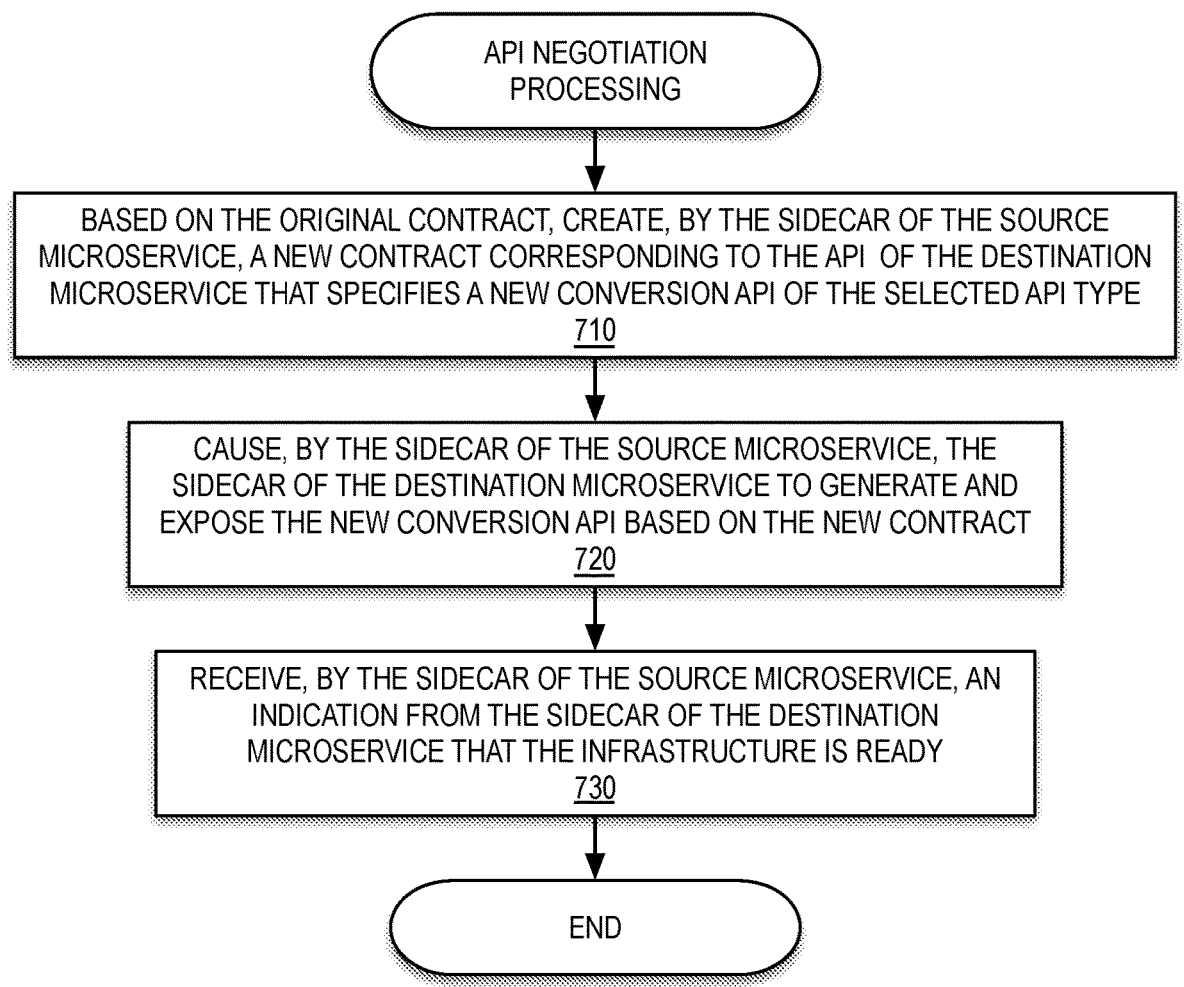
FIG. 7 is a flow diagram illustrating operations for performing API negotiation processing according to some embodiments.

FIG. 7 is a flow diagram illustrating operations for performing API negotiation processing according to some embodiments. In the context of the present example, an API type has previously been statically or dynamically selected to be used to communicate between a source microservice (e.g., microservice 210a) and a destination microservice (e.g., microservice 210b) via respective sidecars (e.g., sidecar 215a and sidecar 215b). The processing described with reference to FIG. 7 represents an example of processing that may be performed by block 550 of FIG. 5 and block 660 of FIG. 6 by an API negotiation module (e.g., API negotiation module 222a) based on the selected API type.

At block 710, the sidecar of the source microservice creates a new contract corresponding to the API (e.g., API 211b) of the destination microservice that specifies a new conversion API (e.g., one of conversion APIs 225b) of the selected API type. For example, based on the original contract (e.g., obtained previously at block 330 of FIG. 3 and cached locally within a data store (e.g., data store 261*a*)), the API negotiation module may apply an appropriate compiler associated with the selected API type to the original contract to generate the new contact of the selected API type. For example, if the selected API type is gRPC, the new contract may include a new service definition in the form of a .proto file.

At block 720, the sidecar causes the remote sidecar (e.g., sidecar 215*b*) to generate and expose the new conversion API based on the new contract, for example, by communicating the new contract to the remote sidecar via the special port or an explicit API exposed by the remote sidecar.

At block 730, after the remote sidecar has generated and exposed the new conversion API, the sidecar receives an indication from the remote sidecar that the infrastructure is ready for use.

While in the context of the flow diagrams presented herein, a number of enumerated blocks are included, it is to be understood that the examples may include additional blocks before, after, and/or in between the enumerated blocks. Similarly, in some examples, one or more of the enumerated blocks may be omitted or performed in a different order.

Example Computer System

Figure 8:
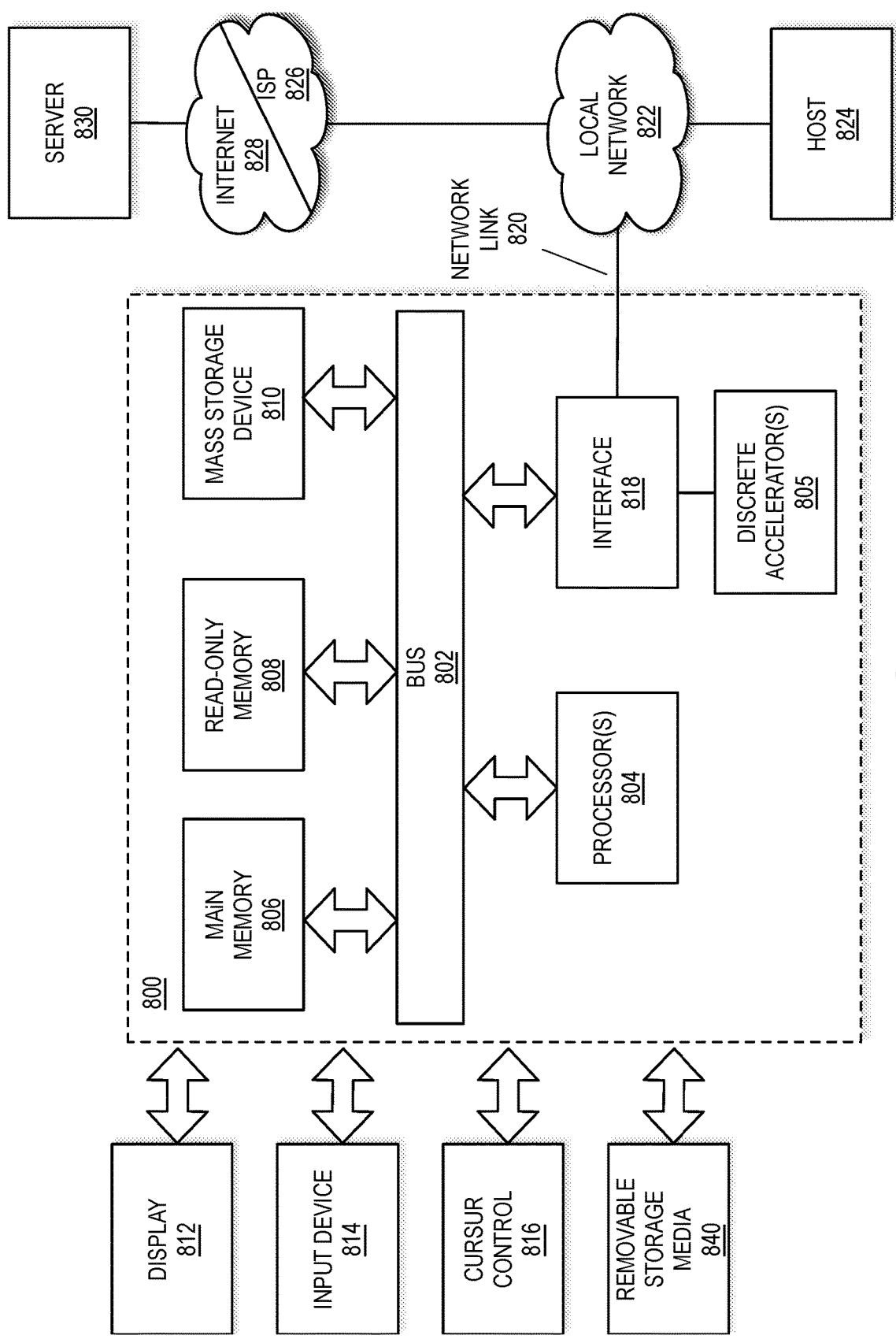
FIG. 8 is an example of a computer system in which one or more devices and/or with which one or more devices of a cluster may be associated according to some embodiments.

FIG. 8 is an example of a computer system 800 in which one or more devices and/or with which one or more devices of a cluster (e.g., cluster 100) may be associated according to some embodiments. Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., one or more hardware processors 804) coupled with bus 802 for processing information. The processing resource may be, for example, one or more general-purpose microprocessors or a system on a chip (SoC) integrated circuit, a non-limiting example of which is described below with reference to FIG. 9.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes interface circuitry 818 coupled to bus 802. The interface circuitry 818 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. As such, interface 818 may couple the processing resource in communication with one or more discrete accelerators 805 (e.g., one or more XPUs).

Interface 818 may also provide a two-way data communication coupling to a network link 820 that is connected to a local network 822. For example, interface 818 may be an integrated services digital network (ISDN) card, cable modem, satellite modem, or a modem to provide a data communication connection to a corresponding type of telephone line. As another example, interface 818 may be a local area network (LAN) card to provide a data communication connection to a compatible LAN. Wireless links may also be implemented. In any such implementation, interface 818 may send and receive electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

Example System on a Chip (SoC) Integrated Circuit

Figure 9:
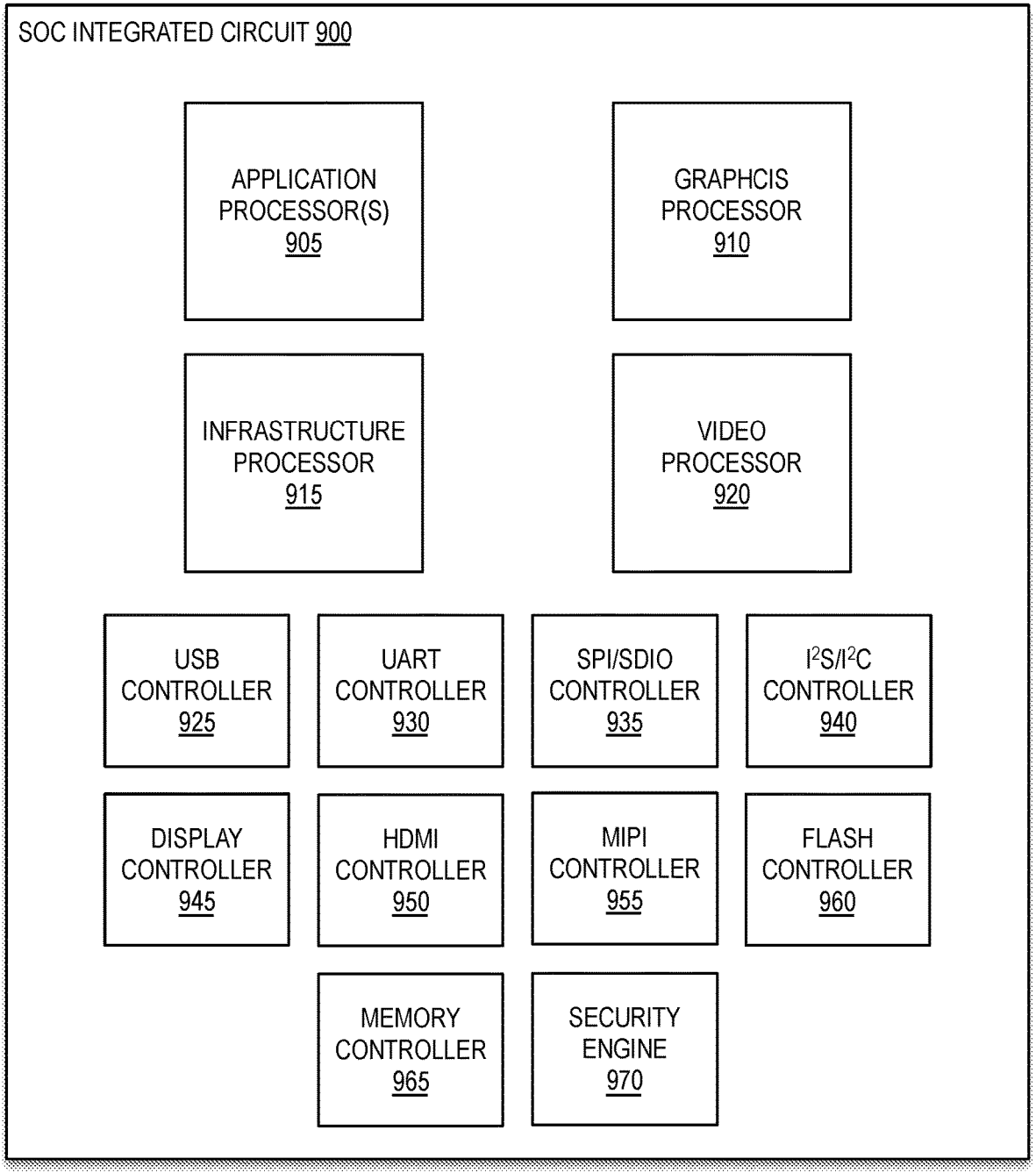
FIG. 9 is a block diagram illustrating an example system on a chip (SoC) integrated circuit in which one or more processors and XPUs may be implemented according to some embodiments.

FIG. 9 is a block diagram illustrating an example system on a chip (SoC) integrated circuit 900 in which one or more processors and XPUs may be implemented according to some embodiments. In the context of the present example, integrated circuit 900 includes one or more application processor(s) 905 (e.g., CPUs) and one or more XPUs, for example, one or more of a graphics processor 910, an infrastructure processor 915, and a video processor 920, any of which may be a modular IP core from the same or multiple different design facilities. Integrated circuit 900 may also include peripheral or bus logic including a Universal Serial Bus (USB) controller 925, a Universal Asynchronous Receiver-Transmitter (UART) controller 930, an SPI/SDIO controller 1235, and an Inter-IC Sound Bus/Inter-IC communication ($I^2S/I^2C$) controller 940. Additionally, the integrated circuit can include a display device controller 945 coupled to one or more of a high-definition multimedia interface (HDMI) controller 950 and a mobile industry processor interface (MIPI) display interface 955. Storage may be provided by a flash memory subsystem 960 including flash memory and a flash memory controller. Memory interface may be provided via a memory controller 965 for access to SDRAM or SRAM memory devices. Some integrated circuits additionally include an embedded security engine 970.

Many of the methods may be described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a method comprising: intercepting, by a first sidecar of a first microservice, a first call by the first microservice to a first application programming interface (API) of a second microservice, wherein the first API is of a first API type of a plurality of API types and is specified by a first contract; selecting, by the first sidecar, an API type of the plurality of API types; and responsive to determining the selected API type differs from the first API type: transforming, by the first sidecar, the first contract into a second contract specifying a second API of the selected API type corresponding to the first API; and causing, by the first sidecar, a second sidecar of the second microservice to generate the second API and internally connect the second API to the first API by providing the second contract to the second sidecar.

Example 2 includes the subject matter of Example 1, wherein the plurality of API types include one or more of grpc remote procedure call (gRPC), GraphQL, and Representational State Transfer (REST).

Example 3 includes the subject matter of Examples 1-2, wherein the first microservice and the second microservice are running on a hardware platform and wherein selection of the second API type is performed statically based on configuration information associated with the hardware platform.

Example 4 includes the subject matter of Examples 1-3, wherein the configuration information specifies the use of gRPC for the hardware platform to take advantage of performance optimizations implemented by the hardware platform for running gRPC.

Example 5 includes the subject matter of Examples 1-4, wherein selection of the second API type is performed dynamically based on one or more characteristics of the first call.

Example 6 includes the subject matter of Examples 1-5, further comprising responsive to a subsequent call by the first microservice to the first API: intercepting, by the first sidecar, the subsequent call; and translating, by the first sidecar, the subsequent call into a second call to the second API.

Some embodiments pertain to Example 7 that includes a method comprising: intercepting, by a first sidecar of a first microservice running on a hardware platform, a first call by the first microservice to a first application programming interface (API) of a second microservice running on the hardware platform, wherein the first API is of a first API type of a plurality of API types and is specified by a first contract; responsive to determining a preferred API type specified for the hardware platform differs from the first API type: transforming, by the first sidecar, the first contract into a second contract specifying a second API of the preferred API type corresponding to the first API; and causing, by the first sidecar, a second sidecar associated with the second microservice to generate the second API based on the second contract and internally connect the second API to the first API via a converter module implemented by the second sidecar by providing the second contract to the second sidecar.

Example 8 includes the subject matter of Example 7, wherein the plurality of API types include one or more of grpc remote procedure call (gRPC), GraphQL, and Representational State Transfer (REST).

Example 9 includes the subject matter of Examples 7-8, wherein the hardware platform implements performance optimizations for running APIs of the preferred API type, thereby making the preferred API type a most efficient mechanism among the plurality of API types for performing communications between the first microservice and the second microservice.

Example 10 includes the subject matter of Examples 7-9, wherein the preferred API type comprises gRPC.

Example 11 includes the subject matter of Examples 7-10, further comprising responsive to a subsequent call by the first microservice to the first API: intercepting, by the first sidecar, the subsequent call; and translating, by the first sidecar, the subsequent call into a second call to the second API.

Some embodiments pertain to Example 12 that includes a non-transitory machine-readable medium storing instructions, which when executed by a hardware platform cause the hardware platform to perform a method comprising: intercepting, by a first sidecar of a first microservice, a first call by the first microservice to a first application programming interface (API) of a second microservice, wherein the first API is of a first API type of a plurality of API types and is specified by a first contract; responsive to determining a preferred API type specified for the hardware platform differs from the first API type: transforming, by the first sidecar, the first contract into a second contract specifying a second API of the preferred API type corresponding to the first API; and causing, by the first sidecar, a second sidecar associated with the second microservice to generate the second API based on the second contract and internally connect the second API to the first API via a converter module implemented by the second sidecar by providing the second contract to the second sidecar.

Example 13 includes the subject matter of Example 12, wherein the plurality of API types include one or more of grpc remote procedure call (gRPC), GraphQL, and Representational State Transfer (REST).

Example 14 includes the subject matter of Examples 12-13, wherein the hardware platform implements performance optimizations for running APIs of the preferred API type, thereby making the preferred API type a most efficient mechanism among the plurality of API types for performing communications between the first microservice and the second microservice.

Example 15 includes the subject matter of Examples 12-14, wherein the preferred API type comprises gRPC.

Example 16 includes the subject matter of Examples 12-15, wherein the method further comprises responsive to a subsequent call by the first microservice to the first API: intercepting, by the first sidecar, the subsequent call; and translating, by the first sidecar, the subsequent call into a second call to the second API.

Some embodiments pertain to Example 17 that includes a system comprising: a hardware platform; and a machine-readable medium, coupled to the hardware platform, having stored therein instructions representing an application structured as a collection of microservices that when executed by the hardware platform perform a method comprising: intercepting, by a first sidecar of a first microservice of the collection of microservices, a first call by the first microservice to a first application programming interface (API) of a second microservice of the collection of microservices, wherein the first API is of a first API type of a plurality of API types and is specified by a first contract; responsive to determining a preferred API type specified for the hardware platform differs from the first API type: transforming, by the first sidecar, the first contract into a second contract specifying a second API of the preferred API type corresponding to the first API; and causing, by the first sidecar, a second sidecar associated with the second microservice to generate the second API based on the second contract and internally connect the second API to the first API via a converter module implemented by the second sidecar by providing the second contract to the second sidecar.

Example 18 includes the subject matter of Example 17, wherein the plurality of API types include one or more of grpc remote procedure call (gRPC), GraphQL, and Representational State Transfer (REST).

Example 19 includes the subject matter of Examples 17-18, wherein the hardware platform implements performance optimizations for running APIs of the preferred API type, thereby making the preferred API type a most efficient mechanism among the plurality of API types for performing communications between the first microservice and the second microservice.

Example 20 includes the subject matter of Examples 17-19, wherein the method further comprises responsive to a subsequent call by the first microservice to the first API: intercepting, by the first sidecar, the subsequent call; and translating, by the first sidecar, the subsequent call into a second call to the second API.

Some embodiments pertain to Example 21 that includes an apparatus that implements or performs a method of any of Examples 1-11.

Example 22 includes at least one machine-readable medium comprising a plurality of instructions, when executed on a computing device, implement or perform a method or realize an apparatus as described in any preceding Example.

Example 23 includes an apparatus comprising means for performing a method as claimed in any of Examples 1-11.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   intercepting, at a first sidecar of a source microservice, a first call to a first application programming interface (API) exposed by a destination microservice, wherein the first call makes use of a first API technology and is originated by the source microservice and wherein a first contract includes information identifying the first API technology;
   selecting an API technology from a plurality of API technologies;
   determining the selected API technology differs from the first API technology;
   based on the first contract, dynamically generating a second contract specifying an intermediate API that makes use of the selected API technology; and
   causing a second sidecar of the destination microservice to generate the intermediate API and connect the intermediate API to the first API.

2. The method of claim 1, wherein the plurality of API technologies includes Representational State Transfer (REST).

3. The method of claim 1, wherein the source microservice and the destination microservice run on a hardware platform and wherein the selected API technology is determined statically based on configuration information associated with the hardware platform.

4. The method of claim 3, wherein the configuration information identifies a particular API technology of the plurality of API technologies for use on the hardware platform to take advantage of performance optimizations implemented by the hardware platform for the particular API technology.

5. The method of claim 1, wherein the selected API technology is determined dynamically based on one or more characteristics of the first call.

6. The method of claim 1, further comprising:
   after a subsequent call originated by the source microservice to the first API, intercepting, at the first sidecar, the subsequent call; and
   translating the subsequent call into a second call to the intermediate API.

7. A non-transitory machine-readable medium storing instructions, which when executed by a hardware platform cause the hardware platform to:
   intercept, at a first sidecar of a source microservice, a first call to a first application programming interface (API) exposed by a destination microservice, wherein the first call makes use of a first API technology and is originated by the source microservice and wherein a first contract includes information identifying the first API technology;
   select an API technology from a plurality of API technologies;
   determine the selected API technology differs from the first API technology;
   based on the first contract, dynamically generate a second contract specifying an intermediate API that makes use of the selected API technology; and
   cause a second sidecar of the destination microservice to generate the intermediate API and connect the intermediate API to the first API.

8. The non-transitory machine-readable medium of claim 7, wherein the plurality of API technologies includes Representational State Transfer (REST).

9. The non-transitory machine-readable medium of claim 7, wherein the source microservice and the destination microservice run on the hardware platform and wherein the selected API technology is determined statically based on configuration information associated with the hardware platform.

10. The non-transitory machine-readable medium of claim 9, wherein the configuration information identifies a particular API technology of the plurality of API technologies for use on the hardware platform to take advantage of performance optimizations implemented by the hardware platform for the particular API technology.

11. The non-transitory machine-readable medium of claim 7, wherein the selected API technology is determined dynamically based on one or more characteristics of the first call.

12. The non-transitory machine-readable medium of claim 7, wherein the instructions further cause the hardware platform to:
- after a subsequent call originated by the source microservice to the first API, intercept, at the first sidecar, the subsequent call; and
- translate the subsequent call into a second call to the intermediate API.

13. A system comprising:
- a hardware platform; and
- instructions representing an application structured as a collection of microservices that when executed by the hardware platform cause the hardware platform to:
- intercept, at a first sidecar of a source microservice, a first call to a first application programming interface (API) exposed by a destination microservice, wherein the first call makes use of a first API technology and is originated by the source microservice and wherein a first contract includes information identifying the first API technology;
- select an API technology from a plurality of API technologies;
- determine the selected API technology differs from the first API technology;
- based on the first contract, dynamically generate a second contract specifying an intermediate API that makes use of the selected API technology; and
- cause a second sidecar of the destination microservice to generate the intermediate API and connect the intermediate API to the first API.

14. The system of claim 13, wherein the plurality of API technologies includes Representational State Transfer (REST).

15. The system of claim 13, wherein the source microservice and the destination microservice run on the hardware platform and wherein the selected API technology is determined statically based on configuration information associated with the hardware platform that identifies a particular API technology of the plurality of API technologies for use on the hardware platform to take advantage of performance optimizations implemented by the hardware platform for the particular API technology.

16. The system of claim 13, wherein the selected API technology is determined dynamically based on one or more characteristics of the first call.

* * * * *